US006604185B1

(12) United States Patent
Fromm

(10) Patent No.: US 6,604,185 B1
(45) Date of Patent: Aug. 5, 2003

(54) DISTRIBUTION OF ADDRESS-TRANSLATION-PURGE REQUESTS TO MULTIPLE PROCESSORS

(75) Inventor: Eric C. Fromm, Eau Claire, WI (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/619,851

(22) Filed: Jul. 20, 2000

(51) Int. Cl.[7] ............................................. G06F 12/12
(52) U.S. Cl. ...................... 711/207; 711/141; 711/166; 709/250
(58) Field of Search ..................... 709/1, 213, 218, 709/232, 250; 711/141, 207, 206, 202, 166; 713/2; 710/53, 54

(56) References Cited

U.S. PATENT DOCUMENTS

| 4,779,188 | A | * | 10/1988 | Gum et al. ...................... 709/1 |
| 5,437,017 | A | * | 7/1995 | Moore et al. ................ 709/213 |
| 5,506,953 | A | | 4/1996 | Dao |
| 5,574,878 | A | * | 11/1996 | Onodera et al. ............. 711/207 |
| 5,603,056 | A | | 2/1997 | Totani |
| 5,617,537 | A | | 4/1997 | Yamada |
| 5,644,575 | A | * | 7/1997 | McDaniel .................... 370/416 |
| 5,682,512 | A | | 10/1997 | Tetrick |
| 577,429 | A | | 7/1998 | Sukegawa et al ........... 711/129 |
| 5,784,394 | A | * | 7/1998 | Alvarez et al. .............. 714/799 |
| 5,784,706 | A | | 7/1998 | Oberlin et al ................ 711/202 |
| 5,906,001 | A | * | 5/1999 | Wu et al. .................... 711/141 |
| 6,128,282 | A | * | 10/2000 | Liebetreu et al. ............ 370/235 |
| 6,339,812 | B1 | * | 1/2002 | McCracken et al. ......... 711/141 |
| 6,374,331 | B1 | * | 4/2002 | Janakiraman et al. ....... 711/141 |
| 6,412,056 | B1 | | 6/2002 | Gharachorloo et al ...... 711/202 |

OTHER PUBLICATIONS

Gjessing, et al., "Performance of the RamLink Memory Archritecture", *Proceedings HICSS'94*, (1994), 154–162.

Gjessing, Stein., et al., "RamLink: A High–Bandwidth–Point–to–Point Memory Architecture", *Proceeding CompCon*, (1992), 328/331.

IEEE STD, "IEEE Standard for High–Bandwidth Memory Interface Based on Scalable Coherent Interface(SCI) Signaling Technology (RAMLink)", *IEEE Std 1596.4–1996*, (1996), 1–91.

* cited by examiner

Primary Examiner—B. James Peikari
(74) Attorney, Agent, or Firm—Schwegman, Lundberg, Woessner & Kluth, P.A.

(57) ABSTRACT

A method and apparatus for deallocating memory in a multi-processor, shared memory system. In one aspect, a node in the system has a node controller that contains sequencing logic. The sequencing logic receives a command across a network. The sequencing logic translates the received command into a Purge Translation Cache (PTC) instruction and sends the PTC instruction across a bus to a processor. The processor contains bus control logic that receives the PTC instruction and purges a virtual address specified in the PTC instruction from the processor's translation lookaside buffer. By purging the virtual address, the memory is deallocated.

16 Claims, 4 Drawing Sheets

| # | CURRENT STATE DESCRIPTION | EVENT | ACTIONS | NEXT STATE | COMMENT |
|---|---|---|---|---|---|
| 0 | WAIT FOR ANY PTC_0 WRITE | WRITE TO PTC_0 | SEND WACK | 1 | |
| | | WRITE TO PTC_1 | SEND NACK | 0 | |
| 1 | WAIT FOR RELATED PTC_1 WRITE | WRITE TO PTC_0 | SEND NACK | 1 | |
| | | UNRELATED WRITE TO PTC_1 | | | |
| | | RELATED WRITE TO PTC_1 | ACCEPT AND ISSUE LPTC REQUEST | 2 | DO NOT SEND WACK YET |
| | | TIME OUT | SEND ERROR TO PTC_1 SOURCE | 0 | |
| 2 | WAIT FOR TND | TND=1, NO TIME OUT | | 3 | |
| | | TND=0, NO TIME OUT | | 2 | |
| | | TIME OUT | SEND ERROR TO PTC_1 SOURCE | 0 | NACK RESPONSE TO ALL NEW PTC WRITES |
| 3 | WAIT FOR NO TND | TND=0, NO TIME OUT | SEND WACK TO PTC_1 SOURCE | 0 | |
| | | TND=1, NO TIME OUT | | 3 | |
| | | TIME OUT | SEND DEADLOCK TO PTC_1 SOURCE | 4 | |
| 4 | DEADLOCK DETECTED | TND=1 | | 4 | DEADLOCK RESPONSE TO ALL NEW PTC WRITES |
| | | TND=0 | | 0 | |

FIG. 4

DISTRIBUTION OF ADDRESS-TRANSLATION-PURGE REQUESTS TO MULTIPLE PROCESSORS

FIELD OF THE INVENTION

This invention relates to the field of multi-processor, shared-memory computer systems.

BACKGROUND OF THE INVENTION

A computer system typically contains a processor, which is the element of the computer system that controls operation of the computer and executes computer instructions in order to do useful work. This useful work, which is requested by a user of the computer, is often called a "user job." In order to speed the processing of user jobs, computers have been developed that contain multiple processors, so that a user job can be broken up into pieces, each of which can run concurrently on a different processor. These multiple processors might be contained within one computer system, or they might be distributed across multiple computer systems connected via a network. Just as ten people working concurrently can theoretically dig a ditch ten times faster than one person working alone, ten processors can theoretically complete a user job ten times faster than one processor executing alone.

User jobs need computer memory to store their data, and multiple processors working cooperatively on user jobs typically share memory in order to speed up processing. Since the memory is shared, processors often share common mappings between the user's virtual address space and physical memory. Computers have created the notion of virtual versus physical addresses in order to simplify user jobs, so that they need not worry about where the data is actually stored. To the user job, a virtual address space appears as one uniform, monolithic entity, but the physical data may actually be stored across multiple storage devices of different types in different locations. A processor stores a mapping of its virtual addresses to physical addresses in a place called a "translation lookaside buffer." When the user job accesses data at a particular virtual address, the processor looks in its translation lookaside buffer to find the actual physical address of the data.

When a user job starts, the processor allocates virtual memory for that job to use. Different jobs need to be using different virtual address spaces, so they don't mistakenly access or modify each other's data. When a user job that is executing cooperatively on multiple processors stops executing because it completes or because it was terminated, the shared, virtual memory needs to be freed or deallocated, so that it is available for use by other jobs.

When one processor determines that user job is stopped, prior multi-processor shared-memory systems have deallocated their own shared memory and then sent a message to other processors that are working cooperatively on the same user job. This message interrupts the other processors in the middle of whatever work they are doing and instructs them to deallocate their shared memory associated with the stopped job. The problem with this message and interrupt-based approach is that it is slow because an interrupt directs the processor to suspend its current operations and to execute a specified routine. It takes time for the processor to save the state of its current operations and to switch to a different sequence of operations.

Thus, there is a need for a solution that will deallocate shared memory in a multi-processor environment that works faster than previous shared memory systems.

SUMMARY OF THE INVENTION

The invention is a method an apparatus for deallocating memory in a multi-processor, shared memory system. In one aspect, a node in the system has a node controller that contains sequencing logic. The sequencing logic receives a command across a network. The sequencing logic translates the received command into a Purge Translation Cache (PTC) instruction and sends the PTC instruction across a bus to a processor. The processor contains bus control logic that receives the PTC instruction and purges a virtual address specified in the PTC instruction from the processor's translation lookaside buffer. By purging the virtual address, the memory is deallocated.

BRIEF DESCRIPTION OF THE DRAWINGS

FIGS. 3 and 4 illustrate a block diagram of events, states, and processing for an embodiment of the present invention.

DESCRIPTION OF PREFERRED EMBODIMENTS

In the following detailed description of the various embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the figures generally corresponds to the figure number in which that component is first introduced, such that the same reference number is used throughout to refer to an identical component that appears in multiple figures. Signals and connections may be referred to by the same reference number or label, and the actual meaning will be clear from its use in the context of the description.

Figure 1:
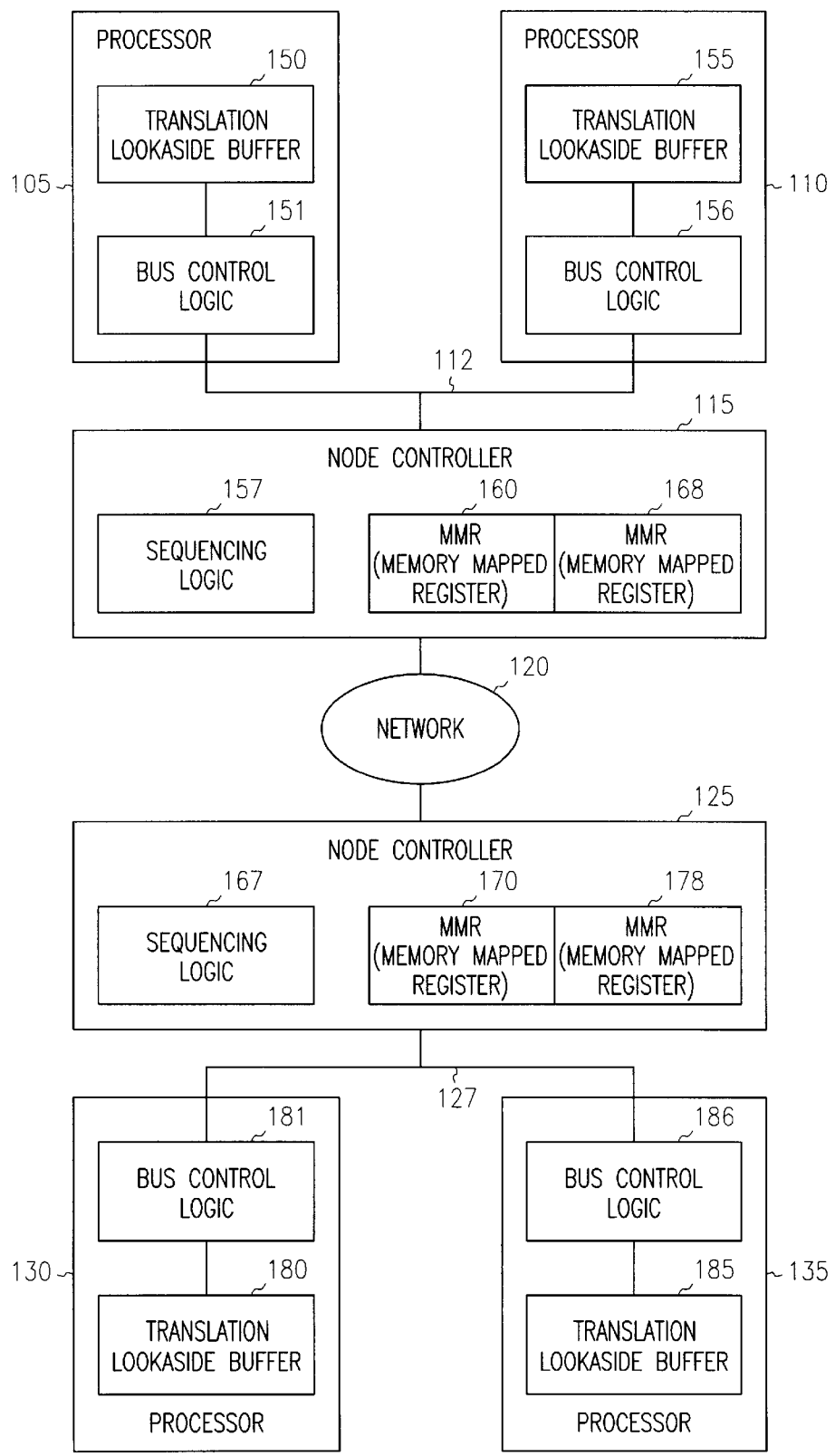
FIG. 1 illustrates a block diagram of one embodiment of the present invention having multiple processors operating in a distributed shared-memory system.

FIG. 1 illustrates a block diagram of one embodiment of the present invention having multiple processors operating in a distributed shared-memory system.

Processors 105 and 110 are connected via bus 112 to node controller 115. Node controller 115 is connected via network 120 to node controller 125. Node controller 125 is connected via bus 127 to processors 130 and 135. Although only two node controllers 115 and 125 are shown connected to network 120, there could be many.

Processor 105 contains translation lookaside buffer 150 and bus control logic 151. Processor 110 contains translation lookaside buffer 155 and bus control logic 156. Processor 130 contains translation lookaside buffer 180 and bus control logic 181. Processor 135 contains translation lookaside buffer 185 and bus control logic 186. A translation lookaside buffer maps virtual addresses that jobs running on a processor use to physical memory addresses.

Bus control logic within a processor monitors the bus for Purge Translation Cache (PTC) instructions. When the bus control logic receives the PTC instruction, it invalidates the address specified in the PTC instruction in the processor's translation lookaside buffer, which effectively deallocates the address. Note that the PTC instruction does not cause an interrupt to the processor because the PTC instruction is processed by the bus control logic. The processing for the bus control logic is further described below under the description for FIG. 2.

Referring again to FIG. 1, node controller 115 contains sequencing logic 157, memory mapped register (MMR) 160, and MMR 168. Node controller 125 contains sequencing logic 167, MMR 170, and MMR 178.

The configuration depicted in FIG. 1 is but one possible implementation of an embodiment of the invention, and the hardware depicted may vary for specific applications. The hardware configuration may also include additional components not depicted in FIG. 1.

Figure 2:
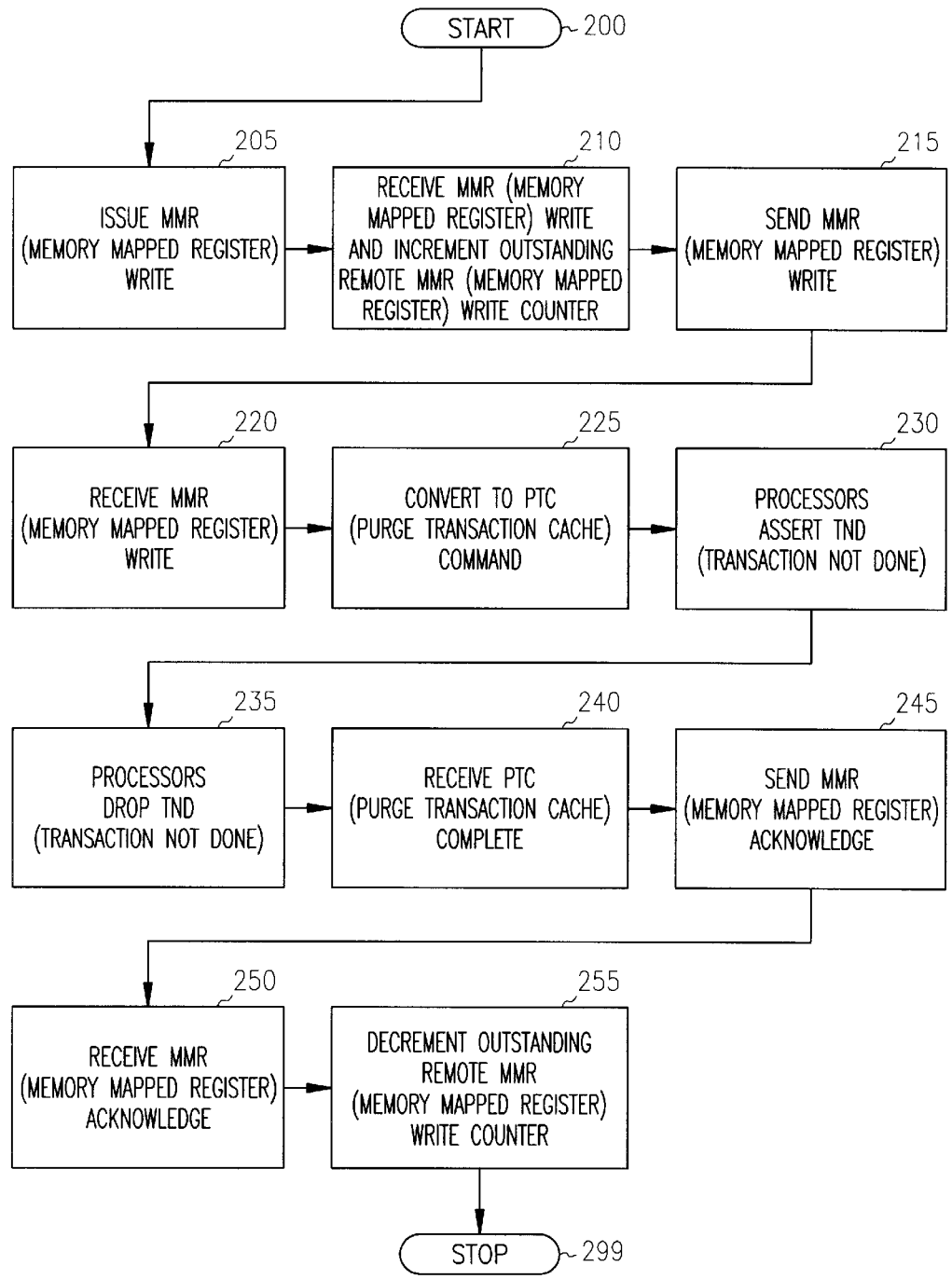
FIG. 2 illustrates a flowchart of an example process flow for an embodiment of the present invention.

FIG. 2 illustrates a flowchart of an example process flow for an embodiment of the present invention. At block 200 control begins. Control then continues to block 205 where the initiating processor, e.g. processor 105, has determined that a job no longer needs some allocated memory having a certain virtual address or addresses, so processor 105 wants to instruct all other processors that are sharing this memory to deallocate this shared memory. Processors in the distributed system deallocate shared memory by purging their translation lookaside buffers of entries associated with those virtual addresses. Processor 105 initiates this deallocation of shared memory by issuing a MMR write command onto bus 112 to the target processor or processors that are sharing the memory. The MMR write command contains data specifying the target processors and the virtual addresses to be deallocated. In this example, the initiating processor is processor 105 and the target processors that are sharing memory with processor 105 are target processors 130 and 135, but the target processors could be on any node in network 120. Also, although in this example there is only one initiating processor, there could be multiple initiating processors, all wanting to deallocate memory from possibly the same target processor concurrently.

Control then continues to block 210 where initiating node controller 115 receives the write command into MMR 160 and MMR 168. Sequencing logic 157 examines the write command and determines that it is designated for another node controller, so sequencing logic 157 increments its counter of outstanding remote MMR writes by one. Control then continues to block 215 where sequencing logic 157 sends the write command across network 120 to target node controller 125.

Control then continues to block 220 where sequencing logic 167 in target node controller 125 receives the write command from network 120 into MMR 170 and MMR 178. Control then continues to block 225 where sequencing logic 167 examines the write command and determines that the write command is intended for it, so sequencing logic 167 converts the write command to a PTC (Purge Translation Cache) bus instruction and sends it on bus 127.

Control then continues to block 230 where bus control logic 181 and 186 are monitoring bus 127. Bus control logic 181 and 186 receive the PTC instruction and assert TND (Transaction Not Done) on bus 127, indicating that they are not yet done processing the PTC instruction. Bus control logic 181 and 186 then purge their respective translation lookaside buffers 180 and 185 of the entry associated with the virtual address specified in PTC instruction, effectively deallocating the memory that they were sharing with processor 105. Thus, the translation lookaside buffers 180 and 185 are purged without causing an interrupt of processors 130 and 135.

When bus control logic 181 and 186 are done purging their translation lookaside buffers, control continues to block 235 where they drop TND on bus 127 and send a PTC complete command across bus 127 to node controller 125.

Control then continues to block 240 where node controller 125 receives both of the PTC instruction complete messages. Control then continues to block 245 where node controller 125 sends a MMR acknowledge command across network 120 to node controller 115. Control then continues to block 250 where sequencing logic 157 in node controller 115 receives the MMR acknowledge message. Control then continues to block 255 where logic 255 decrements its outstanding remote MMR write counter. Control then continues to block 299 where processing stops.

Figure 3:
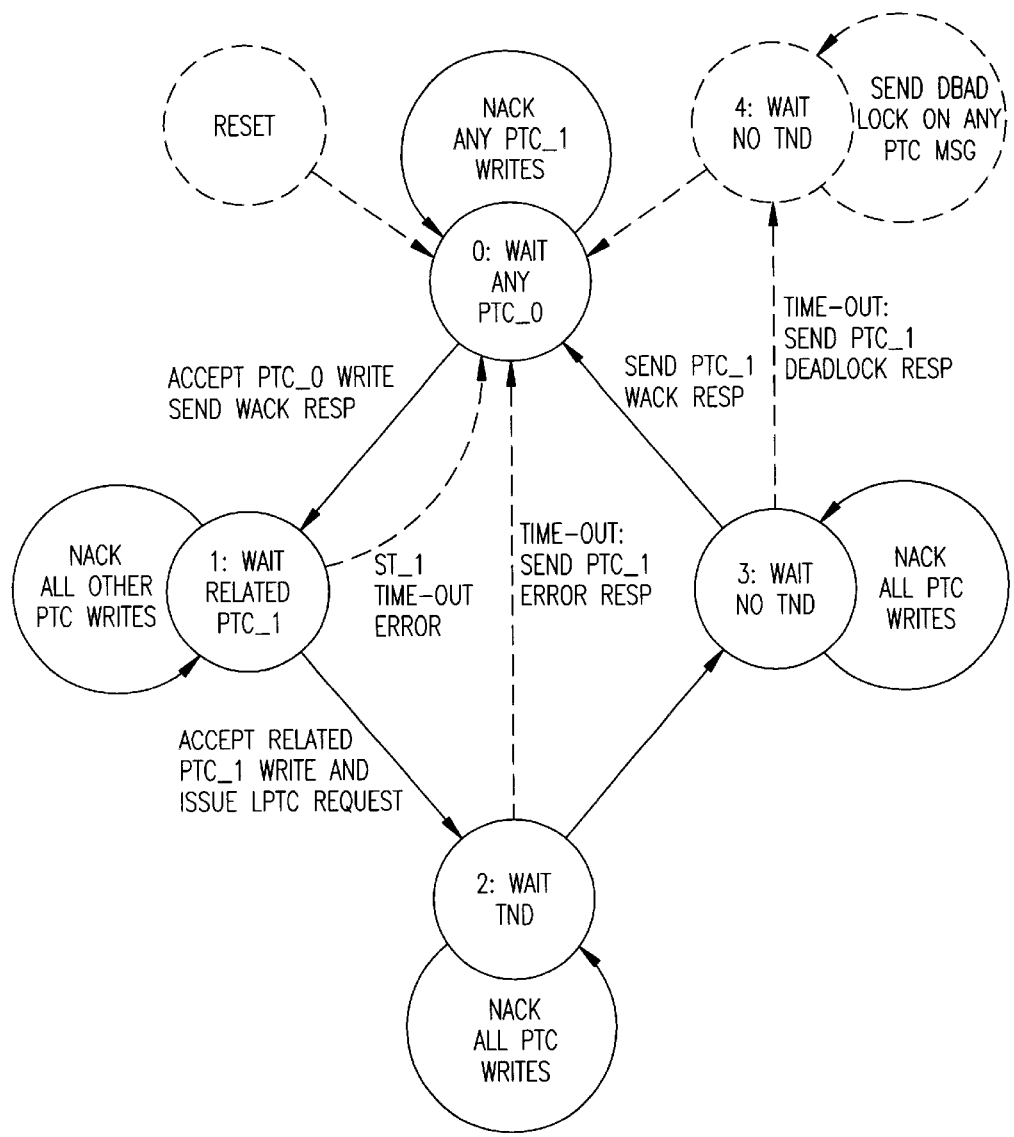

FIGS. 3 and 4 illustrate a state diagram that target node controllers, such as node controller 125, use in order to allow multiple initiating processors to send write commands to the target node controller at the same time. The target node controller will use the state diagram logic of FIGS. 3 and 4 to serialize the write commands from the multiple processors and present the associated PTC commands to the target processor, such as target processor 130, one at a time.

When the node controller is in state 0, it is waiting for any PTC_0 write. A PTC_0 write is the write command that the initiating processor sends to the target node controller. Since the target node controller has two MMRs, for example MMR 170 and MMR 178, one is designated "_0" and the other is designated "_1". When the target node controller receives a write to PTC_0 event in state 0, it sends a WACK (write acknowledge response) back to the initiator and moves to state 1. When the node controller receives a write to PTC_1 event in state 0, it sends a NACK (No acknowledge) back to the initiator and remains in state 0. A NACK means that although the target received the write, the target is not in a proper state to process it, so the initiator must try again.

When the node controller is in state 1, it is waiting for a related PTC_1 write. When the node controller receives a write to PTC_0 event in state 1, it sends a NACK and remains in state 1. When the node controller receives an unrelated write to PTC_1 event in state 1, it sends a NACK and remains in state 1. When the node controller receives a related write to PTC_1 event in state 1, it accepts the write to PTC_1 and issues a LPTC request and moves to state 2. An LPTC request corresponds to issuing the PTC instruction on, for example, bus 127 when node controller 125 is the target node controller. When the node controller receives a timeout event in state 1, it sends an error to PTC_1 source and moves to state 0.

When the node controller is in state 2, it is waiting for a related TND. When the node controller receives a TND=1 in state 2, and the node controller has not timed out, it moves to state 3. TND=1 means the target processor has raised TND. When the node controller receives a TND=0 in state 2, and the node controller has not timed out, it remains in state 2. TND=0 means the target processor has dropped TND. When the node controller receives a time out event in state 2, it sends an error to PTC_1 source and moves to state 0.

When the node controller is in state 3, it is waiting for no TND to be asserted on the bus. When the node controller receives a TND=0 in state 3, and the node controller has not timed out, it sends a WACK to PTC_1 source and moves to state 0. When the node controller receives a TND=1 in state 3, and the node controller has not timed out, it remains in state 3. When the node controller receives a time out event in state 3, it sends a deadlock message to PTC_1 source and moves to state 4.

When the node controller is in state 4, it is waiting for a deadlock detected message. When the node controller receives a TND=1 in state 4, it remains in state 4. When the node controller receives a TND =0 in state 4, it move s to state 0.

It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A computer system, comprising:
   a node controller comprising sequencing logic, wherein the sequencing logic receives a write command from a network, translates the write command into a Purge Translation Cache (PTC) instruction, and sends the PTC instruction to a bus; and
   a processor connected to the node controller via the bus, wherein the processor comprises:
   a translation lookaside buffer, and
   bus control logic, wherein the bus control logic receives the PTC instruction and
   purges a virtual address specified in the PTC instruction from the translation lookaside buffer wherein the node controller further comprises a memory mapped register (MMR) and the write command is a MMR write command.

2. The computer system of claim 1, wherein the bus control logic asserts TND (Transaction Not Done) on the bus after receiving the PTC instruction.

3. The computer system of claim 2, wherein the bus control logic drops TND after purging the virtual address from the translation lookaside buffer.

4. The computer system of claim 1, wherein processor operations continue uninterrupted while the bus control logic purges the virtual address from the translation lookaside buffer.

5. A multi-processor, shared-memory system, comprising:
   a first processor, wherein the first processor sends a write command across a first bus;
   a first node controller comprising first sequencing logic, wherein the first sequencing logic receives the write command from the first bus and sends the write command across a network;
   a second node controller comprising second sequencing logic, wherein the second sequencing logic receives the write command from the network, translates the write command into a Purge Translation Cache (PTC) instruction, and sends the PTC instruction across a second bus; and
   a second processor connected to the second node controller via the second bus, wherein the second processor comprises:
   a translation lookaside buffer, and
   bus control logic, wherein the bus control logic receives the PTC instruction and
   purges a virtual address specified in the PTC instruction from the translation lookaside buffer wherein the second node controller further comprises a memory mapped register (MMR) and the write command is a MMR write command.

6. The multi-processor, shared-memory system of claim 5, wherein the bus control logic further asserts TND (Transaction Not Done) on the second bus after receiving the PTC instruction.

7. The multi-processor, shared-memory system of claim 6, wherein the bus control logic further drops TND after purging the virtual address from the translation lookaside buffer.

8. The multi-processor, shared-memory system of claim 5, wherein operations in the second processor continue uninterrupted while the bus control logic purges the virtual address from the translation lookaside buffer.

9. A method for deallocating memory, comprising:
   receiving a write command from a network;
   translating the write command into a Purge Translation Cache (PTC) instruction;
   sending the PTC instruction across a bus to a processor;
   receiving the PTC instruction at the processor; and
   purging a virtual address specified in the PTC instruction from a translation lookaside buffer wherein the write command is a memory mapped register (MMR) write command.

10. The method of claim 9, further comprising:
    asserting TND (Transaction Not Done) on the bus after receiving the PTC instruction at the processor.

11. The method of claim 10, further comprising:
    dropping TND on the bus after purging the virtual address.

12. The method of claim 9, further comprising:
    continuing operations at the processor uninterrupted during the purging step.

13. A computer system, comprising:
    a node controller comprising sequencing logic, wherein the sequencing logic receives a plurality of write commands from a network, translates the plurality of write commands into a plurality of Purge Translation Cache (PTC) instructions, and sends the plurality of PTC instructions one at a time in series to a bus; and
    a processor connected to the node controller via the bus, wherein the processor comprises:
    a translation lookaside buffer, and
    bus control logic, wherein the bus control logic receives one of the plurality of PTC instructions and purges a virtual address specified in the PTC instruction from the translation lookaside buffer wherein the node controller further comprises a memory mapped register (MMR) and the plurality of write commands are MMR write commands.

14. The computer system of claim 13, wherein the bus control logic asserts TND (Transaction Not Done) on the bus after receiving the PTC instruction.

15. The computer system of claim 14, wherein the bus control logic drops TND after purging the virtual address from the translation lookaside buffer.

16. The computer system of claim 13, wherein processor operations continue uninterrupted while the bus control logic purges the virtual address from the translation lookaside buffer.

* * * * *

UNITED STATES PATENT AND TRADEMARK OFFICE
CERTIFICATE OF CORRECTION

PATENT NO.     : 6,604,185 B1                                        Page 1 of 1
DATED          : August 5, 2003
INVENTOR(S)    : Eric C. Fromm It is certified that error appears in the above-identified patent and that said Letters Patent is hereby corrected as shown below:

<u>Title page,</u>
Item [56], References Cited, U.S. PATENT DOCUMENTS, insert -- et al. -- after "Yamada"; and delete "577,429" and insert -- 5,778,429 -- therefor.

Signed and Sealed this

Twenty-fourth Day of February, 2004

JON W. DUDAS
*Acting Director of the United States Patent and Trademark Office*